(12) United States Patent
Peck, Jr. et al.

(10) Patent No.: US 6,601,182 B1
(45) Date of Patent: Jul. 29, 2003

(54) OPTIMIZED STATIC SLIDING-WINDOW FOR ACK SAMPLING

(75) Inventors: John C. Peck, Jr., San Francisco, CA (US); Sridhar P. Subramanian, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/571,113

(22) Filed: May 12, 2000

(51) Int. Cl.$^7$ ................................. G06F 1/04
(52) U.S. Cl. ..................... 713/401; 713/503
(58) Field of Search ................ 713/400, 401, 713/503, 600; 700/11

(56) References Cited

U.S. PATENT DOCUMENTS

| | | | | |
|---|---|---|---|---|
| 5,261,058 A | * | 11/1993 | Squires et al. ............... | 710/1 |
| 5,424,903 A | * | 6/1995 | Schreiber .................... | 361/166 |
| 5,574,652 A | * | 11/1996 | Murphy .................. | 364/474.22 |
| 6,266,750 B1 | * | 7/2001 | DeMone et al. ............. | 711/169 |
| 6,400,754 B2 | * | 6/2002 | Fleming et al. ............. | 375/140 |

* cited by examiner

Primary Examiner—Dennis M. Butler
(74) Attorney, Agent, or Firm—Hamilton & Terrile,LLP; Stephen A. Terrile

(57) ABSTRACT

A control sequencer circuit issues a sequence of commands to logic devices synchronized to a response by a slave device to a command by a master device. In one instance, the control sequencer circuit is statically adjusted to the timing semantics of the acknowledgment signal of the slave device. The control sequencer circuit includes an event detector, a static sliding window, and a sequencer stage. The event detector receives an acknowledgment signal and a requester ID from a slave device and determines if it is the proper recipient. The static sliding window synchronizes the command sequence to the response by the slave device and adjusts for the timing semantics of the acknowledgment signal of the slave device. The control sequencer stage successively outputs active signals at each clock cycle, thereby generating the command sequence.

17 Claims, 5 Drawing Sheets

OPTIMIZED STATIC SLIDING-WINDOW FOR ACK SAMPLING

BACKGROUND OF THE INVENTION

1. Field of the Invention

The present invention relates to logic device control.

2. Discussion of the Related Art

In many electronic systems, a master device sends commands to slave devices to request data stored in the slave devices. In such a system, a master device sends an identification word ("ID") along with the command to a slave device. In response, the slave device returns the ID along with a response, so as to allow the master device to match the response with the corresponding command.

Often, to acknowledge receipt of a command, a slave device sends an acknowledgment signal, which is timed to indicate the slave device's response time in clock cycles. For example, an acknowledgment signal from a slave device is "one early" if the slave device sends the acknowledgment signal one clock cycle prior to sending the response to a command. The response time indicated by the acknowledgment signal is referred to as the "timing semantics" of the acknowledgment signal. Thus, by using the timing semantics of an acknowledgment signal and returning the ID in the acknowledgment signal, the slave device acknowledges receipt of the command and indicates a response time.

In certain applications, a control sequence circuit uses a slave device's response to a master device's command to synchronize control signals to different logic devices. For example, an application may require four logic devices to receive control signals successively over four clock cycles, beginning at the clock cycle immediately prior to a slave device's response to a master device's command. However, as designs change, the timing semantics of the acknowledgment signal may change while the synchronization of the sequence of commands to the response by the slave device remains the same. Thus, there is also a need for a control sequencer circuit that can be adjusted to the timing semantics of the acknowledgment signal of the slave device.

SUMMARY

The present invention provides a control sequencer circuit that issues a sequence of commands synchronized to a slave device's response to a command. The control sequencer uses the acknowledgment signal from the slave device to time the command sequence with the slave device's response. Furthermore, the control sequencer circuit is statically adjusted to the timing semantics of the acknowledgment signal of the slave device.

The control sequencer circuit includes an event detector, a static sliding window, and a control sequencer stage. The event detector is a circuit coupled to receive an acknowledgment signal and a requester ID from the slave device. When the event detector receives (1) an active acknowledgment signal and (2) a requester ID that matches an ID hardwired to the event detector, it sends an active signal A to the static sliding window. After sending an active signal A, the event detector cannot send another active signal A until it receives an active signal INTERLOCK from the control sequencer stage indicating that a sequence of commands has been sent. This feature prevents the control sequencer circuit from generating a subsequent sequence of commands before a prior sequence of commands has been sent.

The static sliding window is a circuit that synchronizes the command sequence (which is generated by the control sequencer stage) to the slave device's response. When the static sliding window receives an active signal from the event detector, it creates an appropriate delay before sending the active signal to the control sequencer stage. The delay synchronizes the command sequence to the response by the slave device and adjusts for the timing semantics of the acknowledgment signal of the slave device.

In one embodiment, the static sliding window includes a buffer that immediately transmit the active signal to the control sequencer stage. In another embodiment, the static sliding window includes a delay element (e.g., a flip-flop) that creates a one-clock cycle delay before sending the active signal to the control sequencer stage. In yet another embodiment, the static sliding window includes a number of delay elements that create a multi-clock cycle delay before sending the active signal to the control sequencer stage.

The control sequencer stage includes a chain of delay elements. After receiving the active signal from the static sliding window, each delay element successively outputs an active signal at each clock cycle, thereby generating the command sequence to control various logic devices. The last delay element is coupled to send an active signal INTERLOCK to the event detector.

Various embodiments of the present invention will be more fully understood in light of the following detailed description taken together with the accompanying drawings.

BRIEF DESCRIPTION OF THE DRAWINGS

Note that the same reference numbers in different figures indicate the same or like elements.

DETAILED DESCRIPTION

Figure 1:
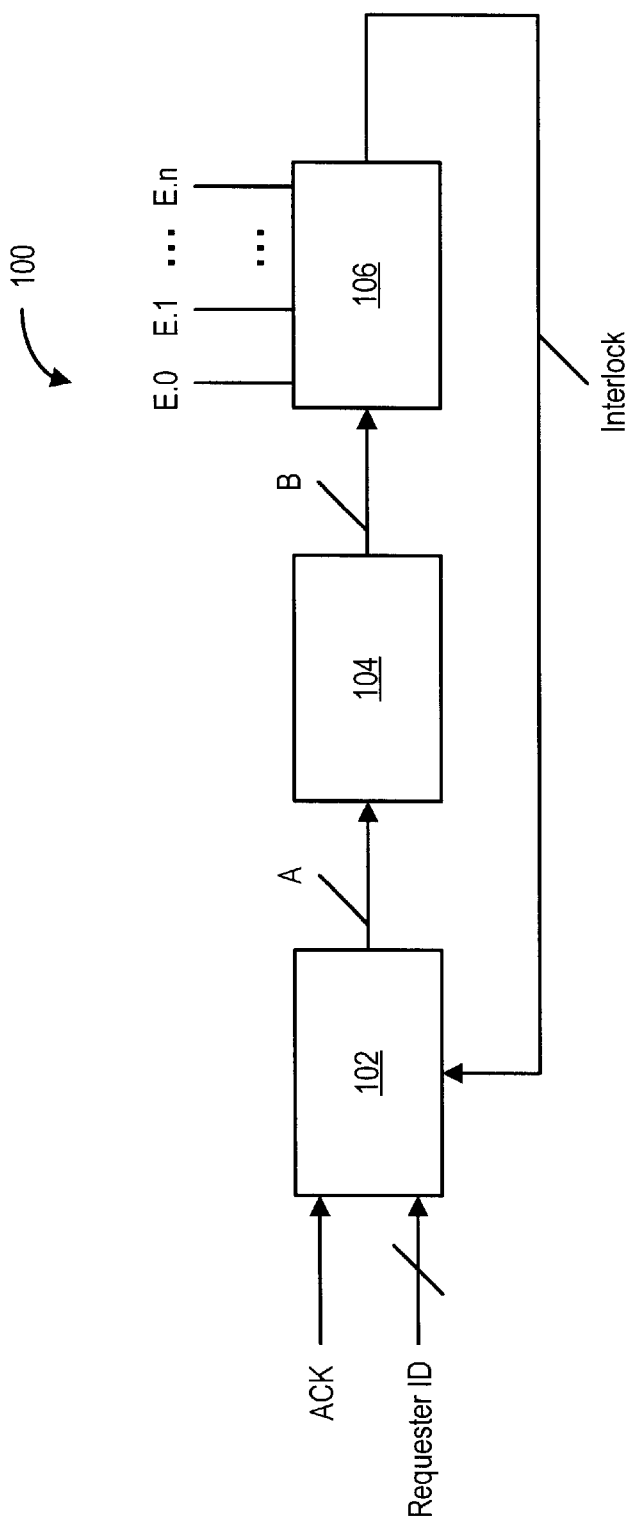
FIG. 1 is a block diagram of control sequencer circuit 100 including event detector 102, static sliding window 104, and control sequencer stage 106, in one embodiment of the present invention.

FIG. 1 is a block diagram of a control sequencer circuit 100, according to one embodiment of the present invention. Control sequencer circuit 100 includes an event detector 102, a static sliding window 104, and a control sequencer stage 106. Event detector 102 receives acknowledgment signal ACK and a requester identifier (ID) from a slave device (not shown), and sends a signal A to static sliding window 104. Upon receiving signal A from event detector 102, static sliding window 104 sends a signal B to control sequencer stage 106. In response to signal B, control sequencer stage 106 sends a sequence of commands to control points E.0, E.1, . . . , E.n and a signal INTERLOCK to event detector 102. After sending active signal A and until it receives an active signal INTERLOCK from control sequencer stage 106 at the end of a command sequence, event detector 102 cannot send another active signal A. Under this scheme, control sequencer circuit 100 is prevented from generating a subsequent sequence of commands before a prior sequence of commands has been sent.

Figure 2:
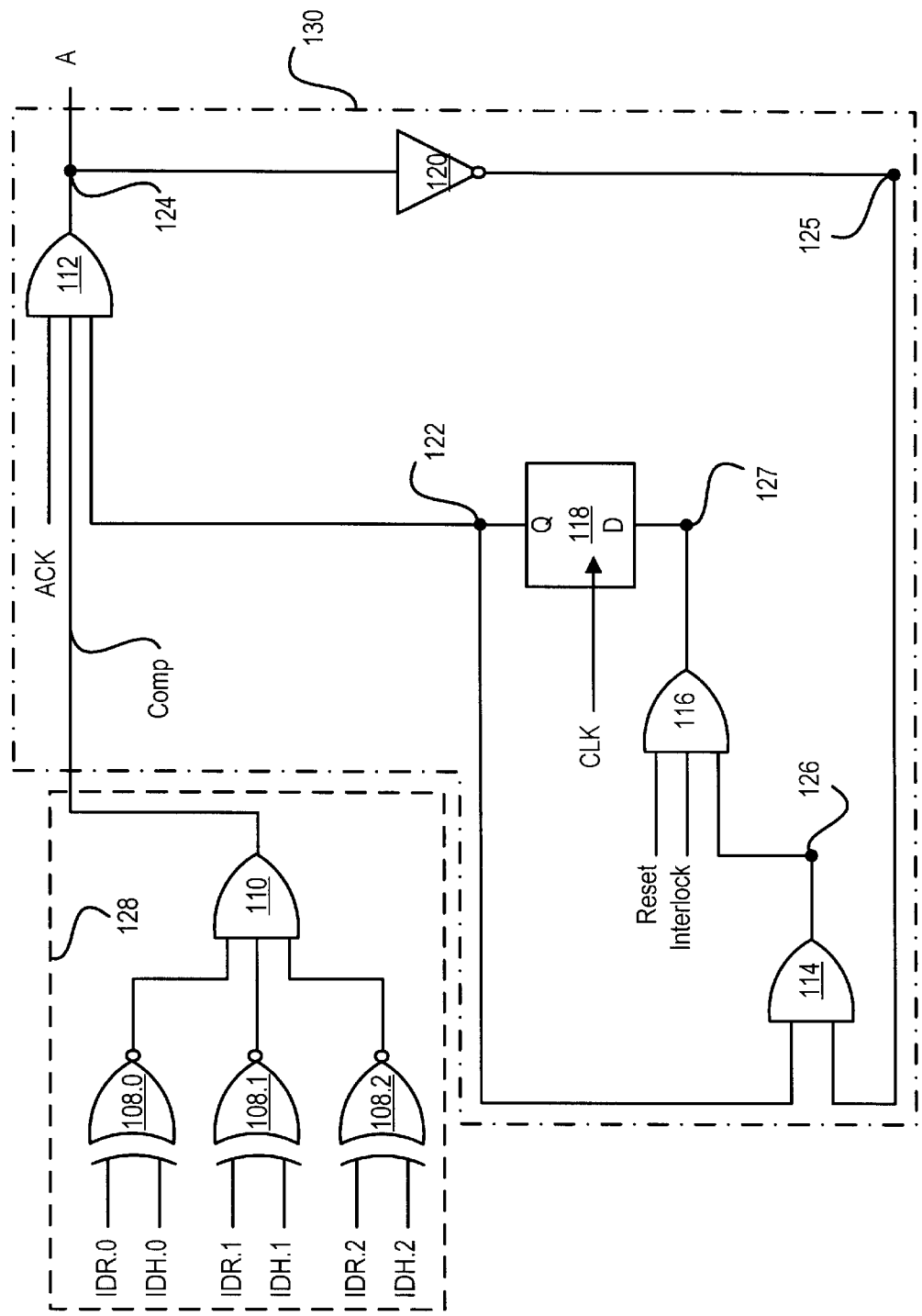
FIG. 2 illustrates event detector 102.

FIG. 2 illustrates event detector 102 in accordance with one embodiment of the present invention. Event detector 102 includes XNOR gates 108.0, 108.1 and 108.2, AND gates 110, 112, 114, OR gate 116, D flip-flop 118, and NOT gate 120. XNOR gates 108.0, 108.1 and 108.2 and AND gate 110 form the comparator block labeled 128. XNOR gates 108.0, 108.1, and 108.2 receive as input bits IDR.0, IDR.1, and IDR.2, respectively, which form a requester ID, and binary bits of IDH.0, IDH.1, and IDH.2, which form a hardwired ID. (The hardwired ID is formed by selectively coupling each of bits IDH.0, IDH.1, and IDH.2 to either an active or an inactive line in control sequencer circuit 100.) In this embodiment, the hardwired ID corresponds to the ID assigned to a master device 200 (not shown) that includes control sequencer circuit 100. AND gate 110, which receives the output signals of XNOR gates 108.0. 108.1 and 108.2, provides an output signal COMP to an input terminal of AND gate 112. Thus, when the requester ID matches the hardwired ID, signal COMP is asserted.

AND gates 112 and 114, OR gate 116, D flip-flop 118, and NOT gate 120 collectively form interlock block 130. AND gate 112 receives acknowledgment signal ACK, the output signal of AND gate 110, and the signal at node 122, and provides output signal A at node 124. Signal A is provided to static sliding window 104. When signal A is active, control sequencer stage 106 issues a number of commands to attached devices, and asserts signal INTERLOCK after the commands are issued. NOT gate 120 provides the complement of signal A at node 125. AND gate 114 receives this complement of signal A at node 125, and the output signal at node 122 of D flip-flop 118, and provides an output signal at node 126. OR gate 116 receives RESET, signal INTERLOCK, and the signal at node 126, to provide an output signal at node 127. D flip-flop 118, which is clocked by clock signal CLK, receives the output signal of OR gate 116 at node 127 and provides an output signal at node 122.

Figure 3:
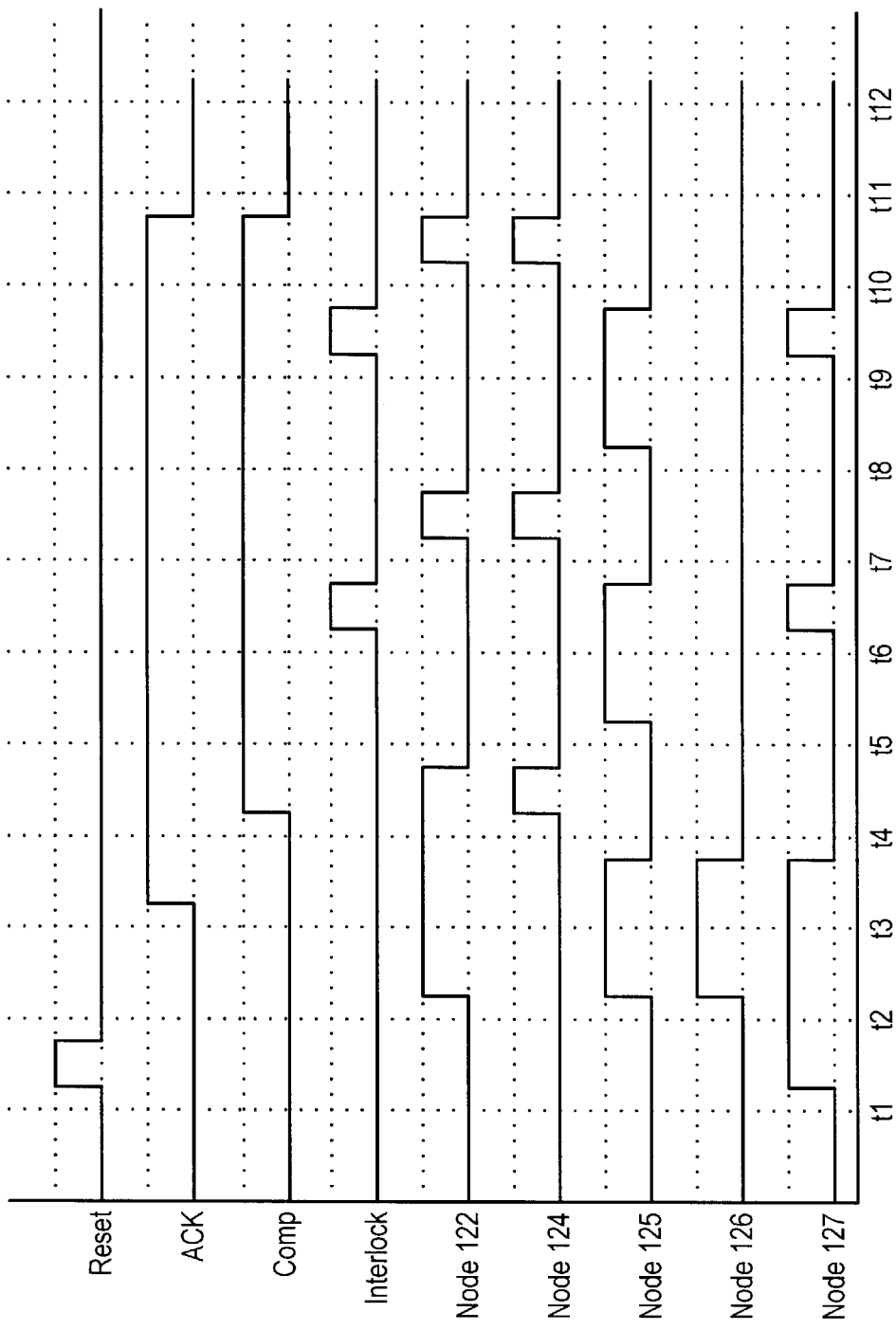
FIG. 3 is an examplary timing diagram of event detector 102.

The operation of interlock block 130 is explained with the assistance of an examplary timing diagram illustrated in FIG. 3. Time t1 to t2 represents the power-up condition at control sequencer circuit 100, during which signal RESET is asserted for one clock cycle to initialize the various devices controlled by control sequencer circuit 100. Consequently, from time t2 to t3, D flip-flop 118 latches the active signal at node 127 to output an active signal at node 122. For illustrative purposely only, assume that signals ACK and COMP are inactive (i.e., the slave device has not acknowledged a command by master device 200), from time t2 to t3, signal A is inactive, so that NOT gate 120 provides an active signal at node 125. Since the signal at node 122 is active from the RESET signal, AND gate 114 outputs an active signal at node 126, thus asserting the signal at node 127. During time t2 to t3, signal INTERLOCK is inactive because control sequencer stage 106 has not issued a command sequence.

To illustrate acknowledgment from a slave device, assume that, from time t3 to t4, signal ACK becomes active due to acknowledgment by a slave device to command issued by a master device other than master device 200 (i.e., signal COMP remains inactive). Thus, the output signal A at AND gate 112 remains inactive. Accordingly, the output signal at node 122 remains active through time t4 to t5. Please note that the requester ID (and thus signal COMP) generally comes before or on the same clock cycle as signal ACK.

Assume that, during time t4 to t5, master device 200 receives an acknowledgment from a slave device (i.e., both signals ACK and COMP are asserted). Consequently, an active signal A is provided at node 124, so that AND gate 114 provides an inactive signal at node 126. From time t4 to t5, signal INTERLOCK remains inactive (i.e., the commands issued as a result of asserting signal A has not completed), so that an inactive signal is provided at node 127. Consequently, from time t5 to t6, D flip-flop 118 outputs an inactive signal at node 122.

From time t5 to t6, the inactive signal at node 122 prevents signal A from being asserted again, even if both COMP and ACK are active, until a clock cycle after a subsequent assertion of signal INTERLOCK.

Assume then that, during time t6 to t7, signal INTERLOCK becomes active, as when a command sequence completes, thus providing once again an active signal at node 127, which enables signal A to be asserted after time t7 by simultaneous active COMP and ACK signals.

Static sliding window 104 synchronizes the command sequence, described below, to a response by the slave device. When static sliding window 104 receives active signal A from event detector 102, static sliding window 104 provides an active signal B after a delay to control sequencer stage 106. The delay synchronizes the command sequence to the response of the slave device and adjusts for the timing semantics of the acknowledgment signal.

Figure 4A:
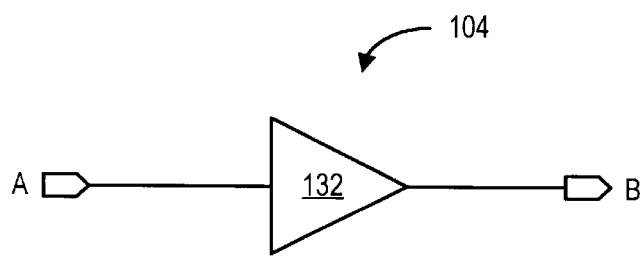
FIG. 4A shows one implementation of static sliding window 104.
Figure 4B:
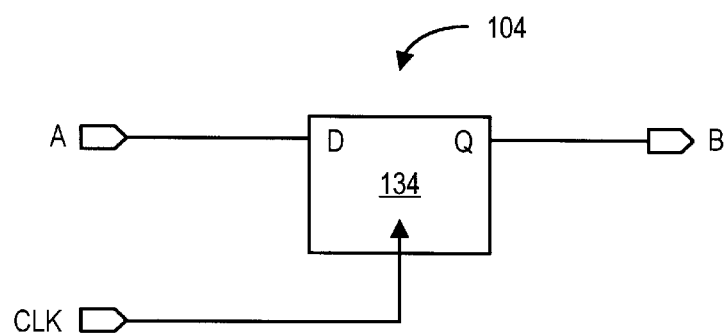
FIG. 4B illustrates another implementation of static sliding window 104.

FIG. 4A illustrates one implementation of static sliding window 104 by buffer 132 with substantially no delay. Thus, under this implementation, signals A and B are asserted substantially simultaneously. Alternatively, as shown in FIG. 4B, static sliding window 104 can be implemented by D flip-flop 134, which delays an active signal A by one cycle of clock signal CLK.

Figure 4C:
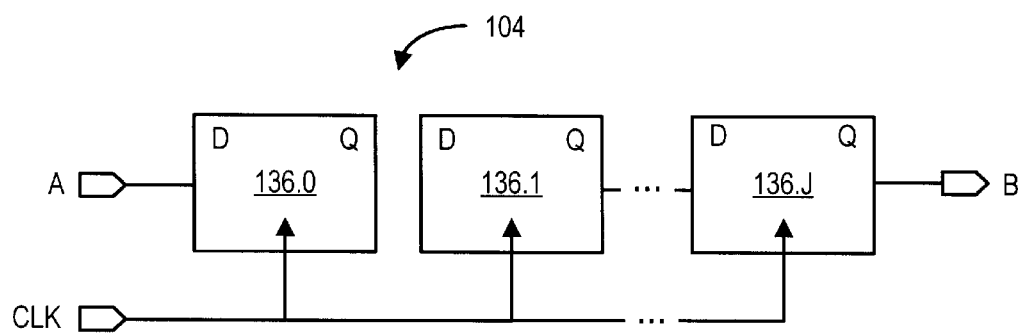
FIG. 4C illustrates yet another static sliding window 104.

FIG. 4C illustrates yet another implementation of static sliding window 104 by a chain of D flip-flops 136.0 to 136.j, delaying active signal A by a number of cycles of clock signal CLK by the number of flip-flops in the chain.

Depending on the timing semantics of the acknowledgment signal from the slave device and the synchronization of the command sequence with the response by the slave device sought to be achieved, one of the three implementations of static sliding window 104 is selected. Thus, for example, if the timing semantics of the acknowledgment signal is "one early" and the application requires the command sequence to start one clock cycle prior to the response by the slave device, buffer 132 is selected because no delay of active signal B is necessary for synchronization. As another example, if the timing semantics of the acknowledgment signal is "two early" and the application requires the command sequence to start one clock cycle prior to the response by the slave device, flip-flop 134 is selected to provide one clock cycle delay of active signal B for synchronization. Similarly, if the timing semantics of the acknowledgment signal is "three early" and the application requires the command sequence to start one clock cycle prior to the response by the slave device, static sliding window 104 can be implemented by two D flip-flops, since a two clock cycle delay of active signal B is necessary for synchronization.

Figure 5:
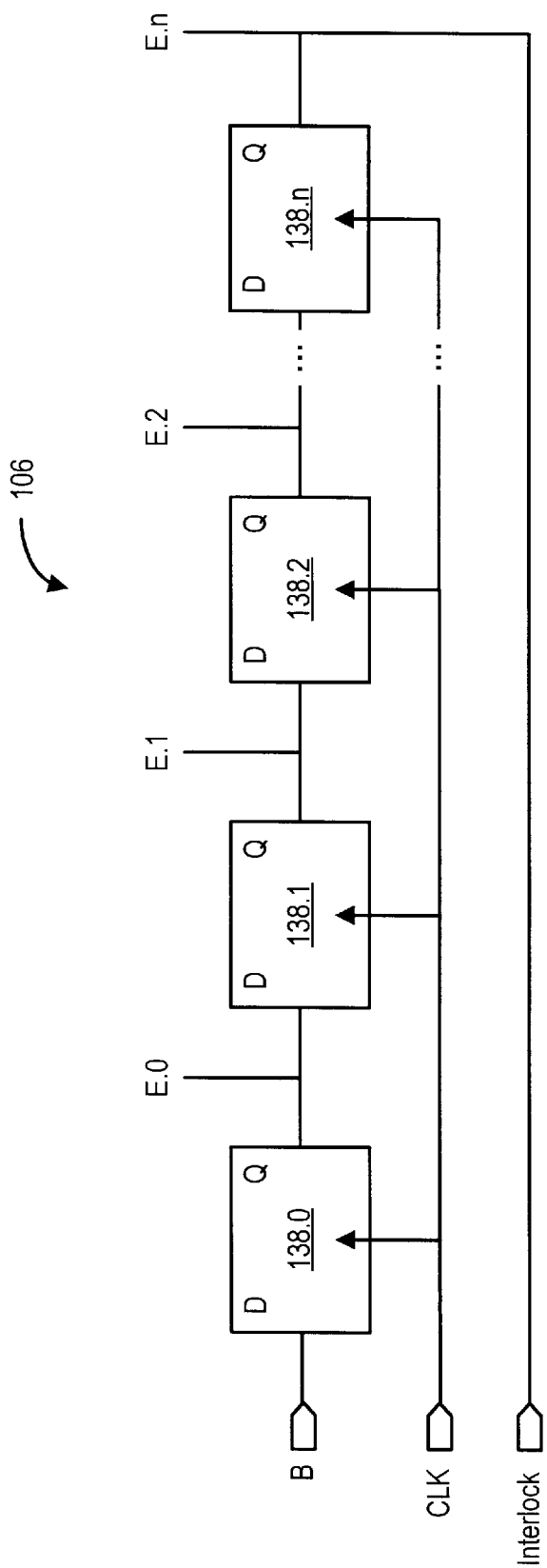
FIG. 5 illustrates control sequencer stage 106.

FIG. 5 illustrates one implementation of control sequencer stage 106 by a chain of D flip-flops. After receiving active signal B from static sliding window 104, an active signal is propagated down the chain of D flip-flop successively, thereby successively generating the command sequence represented by signals E.0, E.1, . . . , En. Signal En is also used as signal INTERLOCK, which is fed back to event detector 102, as illustrated above. Of course, the number of D flip-flops in the chain depends on the number of sequential commands an application requires.

Although the present invention has been described in considerable detail with reference to certain versions thereof, other versions are possible. For example, control sequencer circuit 100 may be implemented to control devices external to master device 200. Control sequencer circuit 100 may also be coupled to multiple slave devices. Control sequencer circuit 100 may further be a device independent of a master device where it synchronizes a sequence of commands to an event that is autonomous from the master device.

What is claimed is:

1. A control sequencer circuit that generates a sequence of commands synchronized with an action by a device, the control sequencer circuit comprising:
   an event detector circuit generating a first signal;
   a static sliding window circuit that receives the first signal from the event detector circuit and generates a second signal after a delay; and
   a control sequencer stage circuit that receives the second signal from the static sliding window circuit and generates the sequence of commands.

2. The control sequencer circuit of claim 1, wherein the event detector circuit detects an acknowledgement signal and a requester ID signal received from the device.

3. A control sequencer circuit that generates a sequence of commands synchronized with an action by a device, the control sequencer circuit comprising:
   an event detector circuit generating a first signal;
   a static sliding window circuit that receives the first signal from the event detector circuit and generates a second signal after a delay; and
   a control sequencer stage circuit that receives the second signal from the static sliding window circuit and generates the sequence of commands;
   wherein the event detector circuit detects an acknowledgement signal and a requester ID signal received from the device; and,
   wherein the event detector circuit compares the requester ID signal with a first ID signal.

4. The control sequencer circuit of claim 3, wherein said event detector circuit further comprises:
   a plurality of XNOR gates having input terminals coupled to respective bits of the requester ID signal and the first ID signal;
   a first AND gate having input terminals coupled to output terminals of the XNOR gates; and
   a second AND gate having input terminals coupled to an output terminal of the first AND gate and the acknowledgement signal, wherein an output terminal of the second AND gate is coupled to the static sliding window circuit.

5. The control sequencer circuit of claim 3, wherein the event detector circuit further includes an interlock circuit that prevents the event detector from further asserting the first signal until the interlock circuit receives a third signal from the control sequencer stage circuit.

6. The control sequencer circuit of claim 5, wherein the interlock circuit includes:
   a NOT gate having input terminals coupled to a first node;
   a first AND gate having input terminals coupled to an output terminal of the NOT gate and a second node;
   an OR gate having input terminals coupled to a RESET signal, the third signal from the control sequencer stage circuit, and the output terminal of the first AND gate;
   a D flip-flop having an input terminal coupled to an output terminal of the OR gate, an output terminal of the D flip-flop being coupled to the second node; and
   a second AND gate having input terminals coupled to the second node, the acknowledgement signal, and a fourth signal from a comparator circuit, an output terminal of the second AND gate being coupled to the first node, wherein the first node is further coupled to the static sliding window circuit.

7. The control sequencer circuit of claim 1, wherein the static sliding window circuit includes a buffer, an output terminal of the buffer being coupled to the control sequencer stage circuit.

8. The control sequencer circuit of claim 1, wherein the static sliding window circuit includes a D flip-flop, an output terminal of the D flip-flop being coupled to the control sequencer stage circuit.

9. The control sequencer circuit of claim 1, wherein the static sliding window circuit includes a chain of D flip-flops, an output terminal of the last D flip-flop being coupled to control sequencer stage circuit.

10. The control sequencer circuit of claim 1, wherein the control sequencer stage circuit includes a chain of D flip-flops, each of output terminals of the flip-flops being coupled to a plurality of control points, an output terminal of the last flip-flop being further coupled to the control sequencer stage circuit.

11. A control sequencer circuit comprising:
    a first circuit coupled to a first identification signal, a second identification signal, and an acknowledgement signal, the first circuit comprising:
      a comparator having an input port coupled to the first identification signal and another input port coupled to the second identification signal;
      a first AND gate having an input terminal coupled to an output line of the comparator and another input terminal coupled to the acknowledgement signal;
    a second circuit comprising at least a first delay element having an input terminal coupled to an output line of the first AND gate; and
    a third circuit comprising at least a second delay element having an input terminal coupled to the output line of the second circuit, the second delay element having an output line carrying a control signal for another circuit external to the control sequencer circuit.

12. The control sequencer circuit of claim 11, wherein the first circuit further comprises:
    a NOT gate having an input terminal coupled to the output line of the first AND gate;
    a second AND gate having an input terminal coupled to an output line of the NOT gate;
    an OR gate having a first input terminal coupled to an output line of the second AND gate and another input terminal coupled to the output line of the second delay element;
    a flip-flop having an input terminal coupled to an output line of the OR gate;
    wherein the first AND gate further has an additional input terminal coupled to an output line of the flip-flop, and the second AND gate having another input terminal coupled to the output line of the flip-flop.

13. The control sequencer circuit of claim 12, wherein the OR gate further has an additional input terminal coupled to a reset signal from a master device.

14. The control sequencer circuit of claim 12, wherein the first delay element is a buffer.

15. The control sequencer circuit of claim 12, wherein one of the first delay element and the second delay element is a flip-flop.

16. A method for generating a sequence of commands synchronized with an action by a device, the method comprising the actions of:

detecting the action by the device, the detecting including receiving an acknowledgement signal and a requester ID signal from the device; and comparing the requester ID signal to a first ID signal; creating a delay before generating the sequence of commands; and generating the sequence of commands.

17. The method of claim 16, wherein the detecting further comprises the acts of preventing the generation of a second sequence of commands if a first sequence of commands is not completely generated.

\* \* \* \* \*